(12) United States Patent
Schreter

(10) Patent No.: US 10,901,789 B2
(45) Date of Patent: Jan. 26, 2021

(54) ASSOCIATIVE REGISTRY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 104 days.

(21) Appl. No.: 16/373,351

(22) Filed: Apr. 2, 2019

(65) Prior Publication Data
US 2020/0319929 A1 Oct. 8, 2020

(51) Int. Cl.
*G06F 9/50* (2006.01)
*G06F 9/448* (2018.01)
*G06F 9/52* (2006.01)

(52) U.S. Cl.
CPC .......... *G06F 9/5016* (2013.01); *G06F 9/4488* (2018.02); *G06F 9/526* (2013.01)

(58) Field of Classification Search
CPC ..... G06F 9/52; G06F 2209/5018; G06F 9/526
See application file for complete search history.

(56) References Cited

U.S. PATENT DOCUMENTS

| | | | |
|---|---|---|---|
| 4,525,780 A * | 6/1985 | Bratt | G01R 31/318505 711/163 |
| 2001/0047436 A1* | 11/2001 | Sexton | G06F 9/4488 719/316 |
| 2003/0014607 A1* | 1/2003 | Slavin | G06F 9/5016 711/170 |
| 2013/0254510 A1* | 9/2013 | Brehmer | G06F 3/0629 711/170 |
| 2015/0081996 A1* | 3/2015 | Flood | G06F 12/0269 711/170 |

* cited by examiner

*Primary Examiner* — Tuan C Dao
(74) *Attorney, Agent, or Firm* — Mintz Levin Cohn Ferris Glovsky and Popeo, P.C.

(57) ABSTRACT

A system and method of registering one or more objects in a container of a multi-threaded computing system. A method includes prefixing, to each object of the one or more objects, an object header having a version counter with an initial version count of zero. The method further includes for each object to be allocated to a thread of the multi-threaded computing system, allocating an object frame associated with each allocated object to the thread while maintaining the object header. The method further includes constructing each allocated object in the object frame after the object header, and initializing the object header of each allocated object by executing a store/store memory barrier and incrementing the version counter by a count of one to mark the associated allocated object as valid.

12 Claims, 2 Drawing Sheets

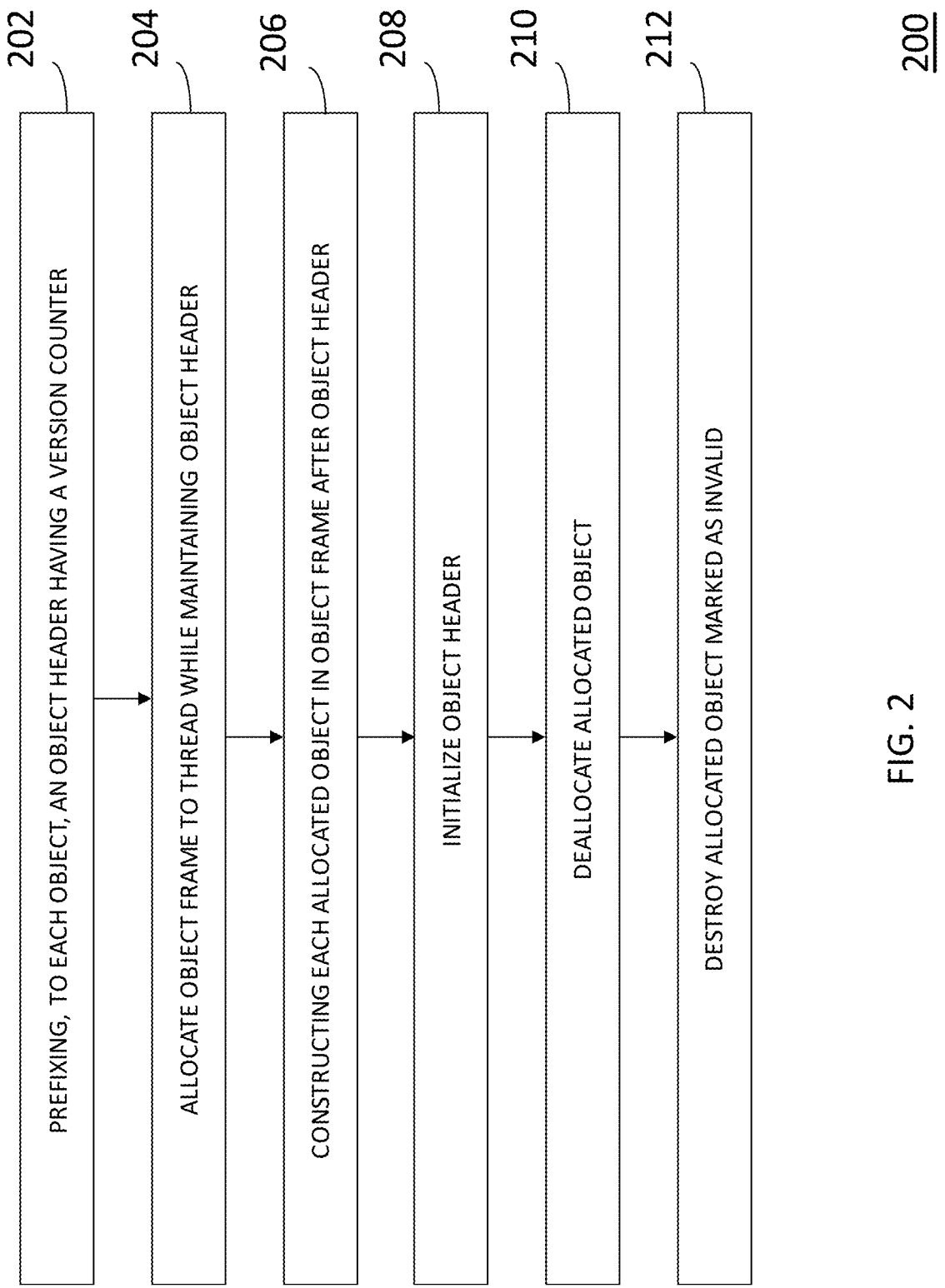

ASSOCIATIVE REGISTRY

TECHNICAL FIELD

The subject matter described herein relates to an associative registry, and more particularly to a system and method for managing highly-volatile registration/deregistration of objects without synchronization.

BACKGROUND

In computing systems, there is often need to register objects into a container to be able to enumerate those objects later, such as, for example, for debug purposes when there is a 1:n relationship between a container and its associated objects. This can be implemented trivially by storing objects, or references to the object, in a traditional data structure, such as a linked list or a tree. Access to these structures then needs to be synchronized, for example as by a mutual exclusion object (mutex), which is a program object that is created so that a number of threads of a multi-threaded program can take turns sharing the same resource, such as access to a common file.

However, in a high-performance, multithreaded application, synchronization between threads is prohibitively expensive in terms of computing resources and time. Traditional lock-based or even lock-free methods can create contention on a central lock structure or a lock-free object head, which severely limits scalability in multi-threaded programs, especially if registration/deregistration is needed to be performed with high frequency.

SUMMARY

This document presents an associative registry as a system and method for managing highly-volatile registration/deregistration of objects without synchronization, but with an ability to enumerate these objects from the outside. In accordance with the system and method, objects can be registered in a container without compromising the scalability of a multi-threaded program, while at the same time providing a mechanism to safely enumerate those objects when the need arises.

Accordingly, any operations on an object done by its owner in the owner's thread, does not cause contention with operations on other objects on other threads since they are distinct. Further, registration and deregistration does not cause contention because of using a high-performance allocator, and even in case of consistent reads, contention is limited to write/read contention, which will not cause cache misses on the owner.

In one aspect, a system and method of registering one or more objects in a container of a multi-threaded computing system includes the steps of prefixing, to each object of the one or more objects, an object header having a version counter with an initial version count of zero. The system and method further include, for each object to be allocated to a thread of the multi-threaded computing system, allocating an object frame associated with each allocated object to the thread while maintaining the object header, and constructing each allocated object in the object frame after the object header. The system and method further include initializing the object header of each allocated object by executing a store/store memory barrier and incrementing the version counter by a count of one to mark the associated allocated object as valid.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an associative registry for a database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 2 shows a process flow diagram illustrating aspects of a method having one or more features consistent with implementations of the current subject matter.

When practical, similar reference numbers denote similar structures, features, or elements.

DETAILED DESCRIPTION

Figure 1:
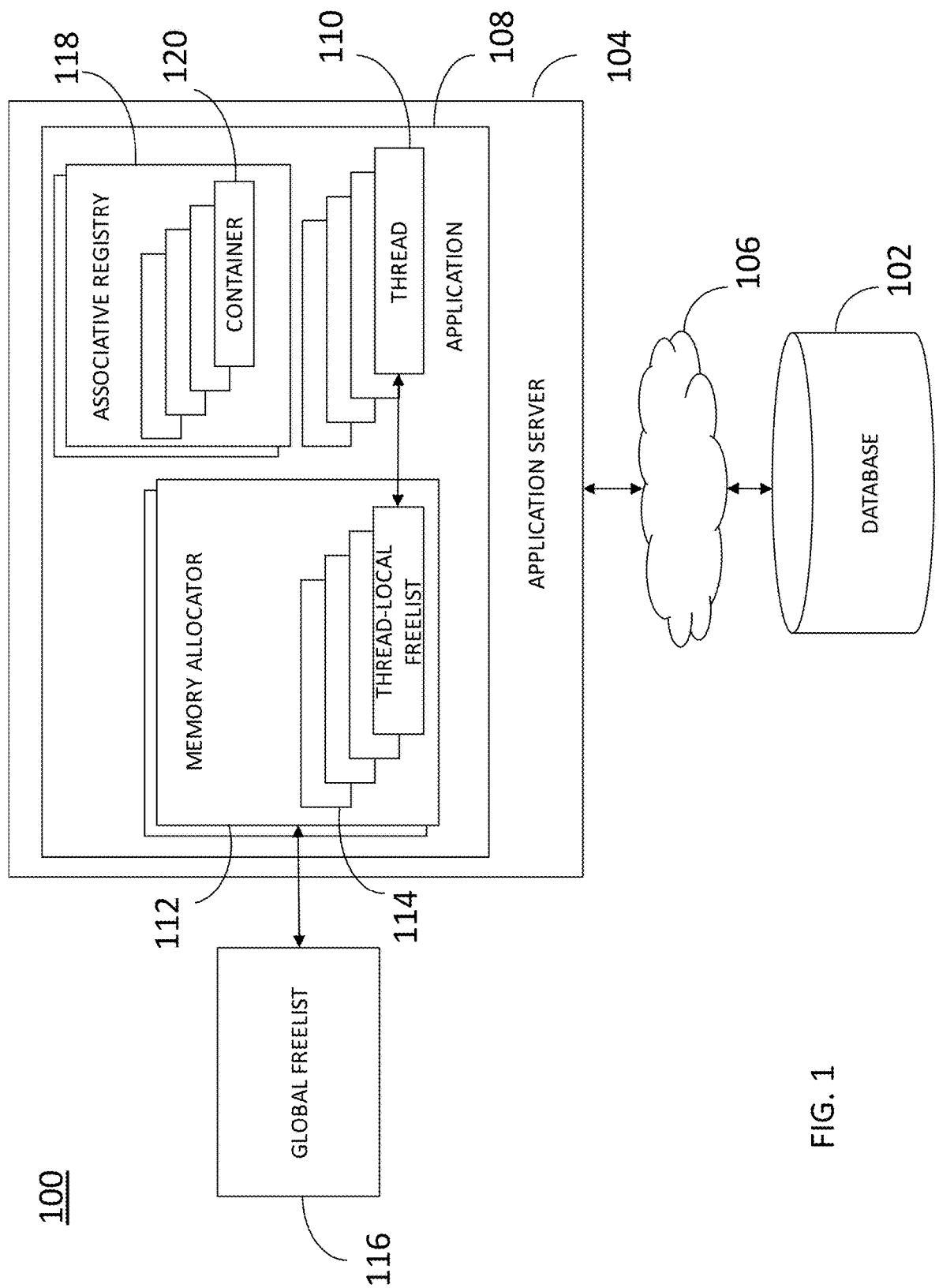
FIG. 1 shows a diagram illustrating aspects of a system showing features consistent with implementations of the current subject matter.

This document describes systems and methods for managing highly-volatile registration/deregistration of objects in a container without synchronization, while enabling enumeration of these objects externally to form an associative registry. In accordance with the systems and methods, objects can be registered in a container without compromising the scalability of a multi-threaded program, while at the same time a mechanism is provided to safely and efficiently enumerate those objects when the need arises. In fact, if consistency of enumeration is not important, the effect of registration is practically immeasurable.

Data Structures

In accordance with some preferred, exemplary implementations, each object of a container of a computing system to be registered is prefixed with a header structure containing:

```
struct ar_header
{
int version=0;
};
```

Consequently, a version counter is used to allow completely lock-free operation on the records, and to resolve a dirty (i.e. inconsistent or error-prone) read during reading. The version counter is initialized to zero for new objects. In accordance with some implementations, even-numbered version numbers can indicate an invalid object, while odd-numbered version numbers can indicate a valid object. The reverse of the version designation can be employed, within the scope of this disclosure.

Further, a global instance of an allocator can be used to allocate object frames.

FIG. 1 depicts a computing system 100 that can implement the presently disclosed system and method. The computing system 100 includes a database 102. The database 102 can be part of an in-memory, column-oriented, relational database management system (DBS) developed and marketed by SAP SE, for example. The database 102 can store and retrieve data as requested by applications that are allowed access to the database 102. In addition, the database 102, as part of a DBS, can perform advanced analytics (predictive analytics, spatial data processing, text analytics, text search, streaming analytics, graph data processing) and includes extract, transform, load (ETL) capabilities.

The system 100 can further include an application server 104, which can communicate with the database 102 directly or via a communication network 106. The communication network 106 can include any number of networks and computing nodes, and can also be referred to herein as the "cloud." The application server 104 executes an application 108 using data stored in the database 102. The application 108 can have one or more executable threads 110, where each thread executes and/or processes a portion of the application 108. The system 100 can further include a high-performance memory allocator 112, which includes a thread-local freelist 114 for allocating memory blocks to a thread based on the thread's need for memory, as well as an availability of memory blocks from the database 102. The memory allocator 112 further includes a global freelist 116.

In accordance with some implementations, the system 100 can include an associative registry 118, as described herein. The associative registry 118 can include one or more containers 120 for storing objects or references to objects. The associative registry 118 can be configured for managing highly-volatile registration/deregistration of objects without synchronization, but also for being able to enumerate these objects externally from the system 100.

New Object Allocation

When a new object is allocated, its object frame is first allocated in the underlying allocator. This either allocates an already-existing object frame for reuse or a completely new object frame. For the sake of simplicity, it can be assumed that deallocation and reallocation of the object frame by the allocator does not destroy the object header, and that the allocation of a new object frame initializes it to zeroes (both can be trivially implemented in the high-performance allocator).

After the new object frame is allocated, the object is constructed using its constructor in the object frame just after the object header. Then, the object header is initialized as follows: a) a store/store memory barrier is executed, to ensure validity of object data in other threads; and b) a version, which is even at allocation time, is incremented by one, making it odd, i.e., marking or designating the object as valid.

After the header is initialized, the object allocation is done and the object can be used normally. Further, setting the version to odd, in accordance with the designations described above, allows enumerating the object in other threads immediately. Therefore, the memory barrier is needed.

Object Deallocation

The object frame is deallocated via the underlying allocator. To do so, the following operations are done: a) the version of the object is incremented by one, setting it to even to indicate an invalid object; b) the store/store memory barrier is executed to ensure validity of the data in other threads; c) a normal object destructor runs, destroying the object; and d) the object frame is deallocated using the underlying high-performance allocator.

The above-described object allocation and deallocation methods ensure that the object always has an odd version number during its validity period. The additional version counter management does not need to be synchronized, except with an inexpensive store/store memory barrier, so that the registration does not add any scalability bottlenecks.

Object Enumeration

Object enumeration is an infrequent operation, and therefore it does not have to be optimized for speed. It can be assumed that the underlying allocator can be used to enumerate existing object frames belonging to the allocator. Accordingly, to enumerate objects in the registry, all objects in the allocator are enumerated using the following method:

```
void enumerate_object(object, callback)
{
    barrier(load/load);
    int version_at_begin = object->version;
    if (is_even(version_at_begin))
        return; // not valid
    barrier(load/load);
    object_type data = object->data;
    barrier(load/load);
    if (version_at_begin != object->version)
        return; // object changed
    callback(data); // callback on a copy
}
```

This method copies the valid object data in a temporary location and then re-checks the version counter. If the counter does not change, then valid data has been copied. Consequently, the callback is called on the valid data. Note, that "valid" does not mean "atomically read." Concurrent access to object data from the object's owner may modify the copied data, so that the copied data may be inconsistent. But, for typical purposes, such as debugging, this is not an issue.

At additional costs, it is possible to guarantee data consistency between object changes by an object's owner and enumeration, as follows: For small objects (typically <=16B), the owner can use atomic operations to modify the object atomically. Since the owner is typically the sole owner of the cache line where the object resides, this does not cause significant additional costs. An enumeration process can then use an atomic read of the object's respective size to read the data atomically. For larger objects (typically >16B), transactional memory (such as Intel's RTM) can be used for writing the object by the owner, and for reading the object by the enumeration. In both cases, reading the object by the owner does not require atomic operations or transactional memory, since the owner is the only one who can write to it.

Further, even when consistency is guaranteed, this does not add scalability bottleneck, since atomic operations and/or transactional memory are local to the thread of execution, i.e., linearly scalable across multiple threads, except for contention through the enumeration, which is a rare event and need not be considered.

FIG. 2 is a flowchart of a method 200 of registering one or more objects in a container of a multi-threaded computing system, such as is illustrated in FIG. 1. At 202, each object of the one or more objects is prefixed with an object header having a version counter with an initial version count of zero. For each object to be allocated to a thread of the multi-threaded computing system, at 204, an object frame associated with each allocated object is allocated to the thread while maintaining the object header. At 206, each allocated object in the object frame is constructed after the object header. At 208, the object header of each allocated object is initialized. The initialization can occur by executing a store/store memory barrier and incrementing the version counter by a count of one to mark the associated allocated object as valid. At 210, an allocated object can be deallocated by incrementing the version counter by a count of one to mark the associated valid allocated object as invalid, and at 212, the allocated object marked as invalid can be destroyed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of registering one or more objects in a container of a multi-threaded computing system, the method comprising:
   prefixing, to each object of the one or more objects, an object header having a version counter with an initial version count of zero;
   for each object to be allocated to a thread of the multi-threaded computing system, allocating an object frame associated with each allocated object to the thread while maintaining the object header;
   constructing each allocated object in the object frame after the object header; and
   initializing the object header of each allocated object by executing a store/store memory barrier and incrementing the version counter by a count of one to mark the associated allocated object as valid.

2. The method in accordance with claim 1, further comprising:
   deallocating an allocated object by incrementing the version counter by a count of one to mark the associated valid allocated object as invalid; and
   destroying the allocated object marked as invalid.

3. The method in accordance with claim 1, wherein the allocating the object frame includes allocating using a global instance of an allocator to allocate the object frame.

4. The method in accordance with claim 1, further comprising registering the initializing in a registry without synchronization, the registry having a plurality of containers for storing data associated with each allocated object.

5. A system for allocating memory to a thread of a multi-threaded program, the system comprising:
   a programmable processor; and
   a machine-readable medium storing instructions that, when executed by the processor, cause the at least one programmable processor to perform operations comprising:
      prefix, to each object of the one or more objects, an object header having a version counter with an initial version count of zero;
      for each object to be allocated to a thread of the multi-threaded computing system, allocate an object frame associated with each allocated object to the thread while maintaining the object header;
      construct each allocated object in the object frame after the object header; and
      initialize the object header of each allocated object by executing a store/store memory barrier and incrementing the version counter by a count of one to mark the associated allocated object as valid.

6. The system in accordance with claim 5, wherein the operations further comprise operations to:
   deallocate an allocated object by incrementing the version counter by a count of one to mark the associated valid allocated object as invalid; and
   destroy the allocated object marked as invalid.

7. The system in accordance with claim 5, wherein the allocating the object frame includes allocating using a global instance of an allocator to allocate the object frame.

8. The system in accordance with claim 5, wherein the operations further comprise an operation to register the initializing in a registry without synchronization, the registry having a plurality of containers for storing data associated with each allocated object.

9. A computer program product comprising a non-transitory machine-readable medium storing instructions that, when executed by at least one programmable processor, cause the at least one programmable processor to perform operations comprising:
   prefix, to each object of the one or more objects, an object header having a version counter with an initial version count of zero;
   for each object to be allocated to a thread of the multi-threaded computing system, allocate an object frame associated with each allocated object to the thread while maintaining the object header;
   construct each allocated object in the object frame after the object header; and
   initialize the object header of each allocated object by executing a store/store memory barrier and incrementing the version counter by a count of one to mark the associated allocated object as valid.

10. The computer program product in accordance with claim 9, wherein the operations further comprise operations to:
    deallocate an allocated object by incrementing the version counter by a count of one to mark the associated valid allocated object as invalid; and
    destroy the allocated object marked as invalid.

11. The computer program product in accordance with claim 9, wherein the allocating the object frame includes allocating using a global instance of an allocator to allocate the object frame.

12. The computer program product in accordance with claim 9, wherein the operations further comprise an operation to register the initializing in a registry without synchronization, the registry having a plurality of containers for storing data associated with each allocated object.

* * * * *